United States Patent [19]

GangaRao

[11] Patent Number: 4,676,035
[45] Date of Patent: Jun. 30, 1987

[54] REINFORCED CONCRETE PANELS WITH IMPROVED WELDED JOINT

[75] Inventor: Hota V. S. GangaRao, Morgantown, W. Va.

[73] Assignee: Home Crafts Corporation, Clarksburg, W. Va.

[21] Appl. No.: 844,939

[22] Filed: Mar. 27, 1986

[51] Int. Cl.⁴ .............................................. E04C 2/04
[52] U.S. Cl. ................................ 52/125.5; 52/127.7; 52/285; 52/583
[58] Field of Search ................... 52/127.7, 125.5, 583, 52/264, 285, 284, 259

[56] References Cited

U.S. PATENT DOCUMENTS

| | | | |
|---|---|---|---|
| 1,624,802 | 4/1927 | Rebell | 52/259 |
| 1,796,048 | 3/1931 | Robinson | 52/206 |
| 2,372,200 | 3/1945 | Hayes | 52/583 X |
| 3,600,863 | 8/1971 | Nachtsheim | 52/583 X |
| 3,722,160 | 3/1973 | Bentley | 52/583 X |
| 4,320,606 | 3/1982 | GangaRao | 52/125.5 |

Primary Examiner—Alfred C. Perham
Attorney, Agent, or Firm—Cushman, Darby & Cushman

[57] ABSTRACT

A wall construction formed from a plurality of pre-cast reinforced concrete building panels each of which includes interior and exterior faces defined peripherally by upper and lower end edges and opposed side edges extending therebetween. The plurality of panels includes two adjacent panels disposed in side by side relation. An improved welded joint is provided between two adjacent side edges of two adjacent side by side panels. The welded joint comprises a plurality of vertically spaced horizontally extending adjacent pairs of welding bars fixed within the two adjacent side edges respectively of the two side by side panels. A single line of welding material is provided for rigidly securing each pair of adjacent welding bars together. Alternatively a bridging plate is welded over each pair of adjacent bars by two lines of welding material.

15 Claims, 5 Drawing Figures

REINFORCED CONCRETE PANELS WITH IMPROVED WELDED JOINT

This invention relates to building construction and more particularly to the construction and formation of buildings from a series of interconnected reinforced concrete panels.

An example of the type of panel to which the present invention is applicable is disclosed in my prior U.S. Pat. No. 4,320,606, the disclosure of which is hereby incorporated by reference into the present specification. The panels disclosed in the patent can be assembled into a finished building structure with a minimum of labor cost. It is generally recognized that the greatest cost factor involved in the construction of a building utilizing wood framing is the labor cost. Wood framing with exterior bricks, or wood shingles and interior plasterboard, have a material cost which is inherently less than the cost of steel reinforced concrete. By providing panels of reinforced concrete of a size which can be conveniently factory cast, transported to the site and erected with portable cranes, sufficient cost reduction in terms of the labor involved in constructing a building of such panels can be achieved if such panels have the following criteria. First, they must form the exterior and interior wall configuration without the need to provide additional finishing beyond a cosmetic coat of paint or the utilization of a particular wallpaper covering. Second, the panels which are to be utilized as exterior walls not only must provide exterior and interior surface configurations but they must likewise provide for a desirable insulation. Third, the panels must be provided with means which will enable them to be simply handled and erected. Fourth, the panels must be provided with means for effecting a secure joint between adjacent panels once erection has been achieved.

Exterior vertical panels constructed in accordance with the principles of the patent provide exterior textured wall surfaces suitable for painting if desired, smooth interior wall surfaces also suitable for painting or wallpaper if desired, spaced reinforcing grids interconnected rigidly along their periphery with reinforcing rods and a pad or layer of insulating material such as polyurethane foam within the central portion of the panel between the grids. A typical panel provides a pair of elongated welding bars extending vertically along each side edge recessed from the exterior and interior surfaces thereof. These panels include exterior solid panels, door panels and window panels. A welded joint is formed between the adjacent side edges of adjacent side by side panels by welding along the adjacent pairs of vertically extending welding bars both exteriorly and interiorly.

The dual vertically extending welding bar joint arrangement of the patent has proven satisfactory in actual operation, however there always exists the need to provide a joint arrangement which achieves all the advantages of the prior art arrangement and secures improved functional and/or economical advantages as well.

An object of the present invention is to fulfill the above described need. In accordance with the principles of the present invention this objective is accomplished by providing a welded joint arrangement between two side by side panels of the type described which comprises a plurality of vertically spaced horizontally extending adjacent pairs of welding bars fixed within the two adjacent side edges respectively of the two side by side panels and a welding material adhered to each pair of welding bars operable to rigidly secure the same together. Preferably the panels in their precast form include an access space associated with each welding bar for enabling the welding operation to take place therethrough from a position outwardly of a common face of the panels. Preferably, the access space extends in communication only with the associated common interior faces so that the associated exterior faces are substantially complete following erection which can be completed solely by access from the interior of the installation.

Another object of the present invention is the provision of a panel of the type described which is simple in construction, economical to manufacture and install and effective in operation.

These and other objects of the present invention will become more apparent during the course of the following detailed description and appended claims.

The invention may best be understood with reference to the accompanying drawings, wherein an illustrative embodiment is shown.

Referring now particularly to the drawings, there is shown therein a solid vertical panel 10 constructed in accordance with the principles of the present invention. The vertical panel 10 includes a pair of reinforcing rod grids 12 which extend vertically generally throughout the vertical extent of the panel. Preferably the grids are of conventional construction made up of a series of parallel vertically extending rods welded to a corresponding series of parallel horizontally extending rods. The pair of grids 12 is rigidly spaced apart horizontally by a series of spacer rods 14 suitably welded between the upper and lower reinforcing rods of the grids 12.

Figure 1:
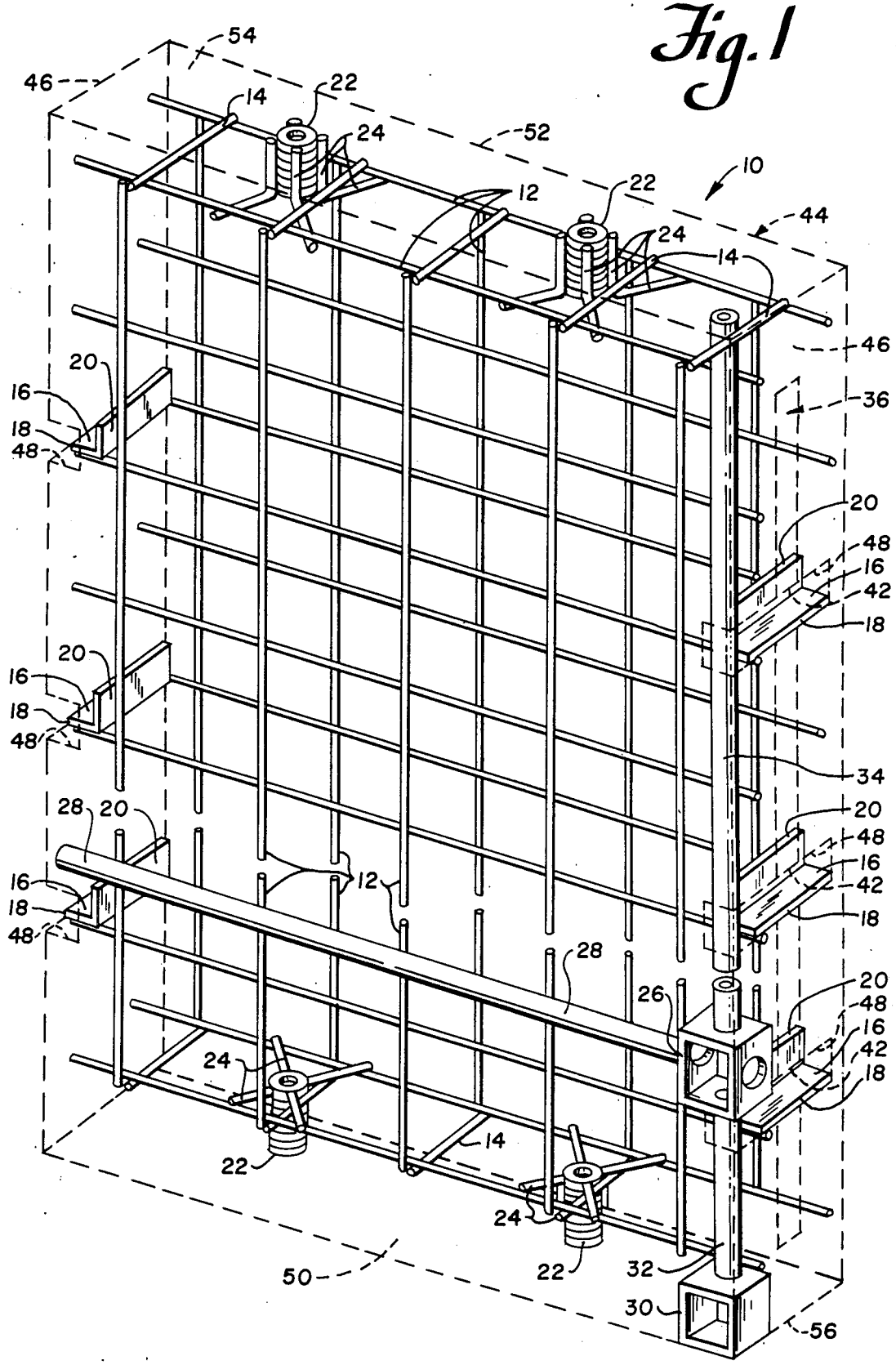
FIG. 1 is a perspective view of a solid vertical panel embodying the principles of the present invention showing the concrete and insulation of the panel in broken lines.

Welded to the spaced ones of the ends of the grids 12 is a transversely extending welding bar 16, there being a plurality of spaced parallel welding bars 16 at each vertical side edge of the panel in vertically registering relation with one another. Each bar 16 is disposed horizontally and includes a free edge 18 which extends outwardly beyond the side edge of the panel a slight amount. Each bar 16 also includes an upwardly extending strengthening flange 20 at its opposite edge. The metal reinforcing structure of the panel 10 is completed by the provision of a plurality of tubular members 22. As shown, each tubular member 22 is preferably in the form of a rod of circular cross-section bent into a helical configuration in which adjacent volutes of the helix are in contact. The interior of each tubular member 22 is thus formed with helical threads. As shown, there are two tubular members 22 secured in vertically extending horizontally spaced relation along the upper edge construction of the panel, each upper tubular member 22 being rigidly secured to the associated reinforcing rod grids 12 by a plurality of L-shaped mounting rods 24 each of which has a vertical leg welded to the exterior periphery of the tubular member and horizontally extending leg welded to the upper rod of an associated grid 12. As shown, there are four such L-shaped mounting rods provided in conjunction with each tubular member 22. The interior of the tubular members 22 define sockets which extend downwardly from the upper edge. As shown in FIG. 1, there is a pair of similar tubular members similarly mounted by L-shaped connecting rods 24 along the lower edge construction of the panel.

Each panel 10 also preferably includes an electrical junction box 26 which is preferably of metal or the like. As shown, the junction box 26 is disposed at a vertical position within the panel corresponding to that normally assumed by a wall plug electrical outlet. The box 26 is preferably of conventional metal construction and, as shown, is rigidly secured to the reinforcing structure of the panel by welding the same to the flange 20 of an associated welding bar 16. Preferably, the box 26 has a metal tube 28 extending from the side wall thereof opposite from that connected with the welding bar 18 which terminates adjacent the opposite side edge configuration of the panel. In the preferred embodiment shown, a second box 30 is provided below the box 26. This box is suitably welded to the lower end of a tube 32 which extends vertically from the upper wall of the lower box 30 to the lower wall of the box 28. An upper vertically extending tube 34 extends upwardly from the upper wall of the box 26 to the upper edge construction of the panel. The tubes may be suitably rigidly fixed to the grids if desired. While the tubes 28, 32 and 34, as shown in FIG. 1, are metal tubes which may be utilized in the manner indicated above to provide some reinforcing capability, they are primarily provided for the purpose of access for electrical wires through the panel to the box 26. It will be understood that it is within the contemplation of the present invention to utilize the box 30 as a plug outlet which would be presented at the baseboard level, in which case the tube 28 would extend to the inner wall of the box 30 and the box 26 could be eliminated in which case a single tube could replace the tubes 32 and 34. It will also be understood that it is within the contemplation of the present invention to provide electrical wire access to the electrical box by simply casting openings within the concrete which is utilized to form the main body of the panel. Likewise, access may be provided a cast in groove along the lower interior surface of the panel which is normally covered by a baseboard in operation. In this regard, boxes 26 and 30 may likewise be provided as cavities cast in the concrete. It will also be understood that the wiring itself can be cast within the concrete.

In addition to the metal components described above, panel 10 also includes a block of rigid insulating material, generally indicated at 36. Preferably, the insulating material is closed cell foamed polyurethane 38 having an exterior wrapping 40 therearound providing a vapor or moisture barrier. The wrapping preferably is a laminate consisting of paper and metal foil. Wrapped blocks of insulating material of this type are commercially available. In this regard, it will be noted that the block of insulating material 36 is of a size such that its side edges are flush with the outwardly facing surfaces 18 of the welding bars 16 at each side edge construction of the panel 10 except in the areas of the flanges 20 which are recessed as indicated at 42. Of course, the upper edge of the block is disposed slightly below the upper connecting rods 14 and the lower edge is disposed slightly above the lower connecting rods 14.

Panel 10 is completed by precasting a body of concrete, generally indicated at 44, in contact with the components thus far described. The body of concrete 44 defines with the associated welding bars 16, electrical junction boxes 26 and 30, and insulation block edges, a pair of opposed side edge configurations, indicated at 46, providing recesses 48 aligned with recesses 42 above the welding bars 16. The body of concrete also provides an interior face 50 which is preferably smooth and provides the interior wall configuration of the panel when in operative position and an exterior face 52 which is preferably cast in a textured configuration, a preferred embodiment being a simulated brick configuration. The simulated brick configuration is preferred, since it can be provided simply in the mold surface during the casting of the panel 10. Other textured configurations can be similarly cast in the face 52. While a cast-in textured surface is preferred, where the economics permit, the surface may be cast with various decorative aggregates, as is well known in the art. In any event, the exterior face 52 defines substantially the entire exterior wall configuration of the panel when in operative position.

Finally, the body of concrete 44 of the panel 10 also defines an upper edge configuration 54 from which the sockets defined by the upper tubular members 22 extend downwardly and a lower edge construction 56 from which the sockets defined by the lower tubular members 22 extend upwardly.

Figure 2:
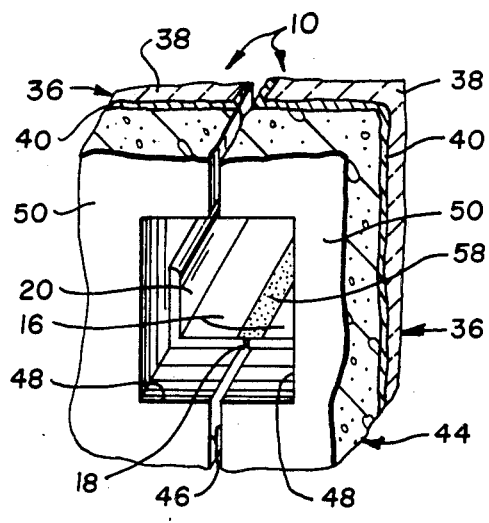
FIG. 2 is a fragmentary perspective view showing one arrangement for joining two panels in side by side relation.
Figure 3:
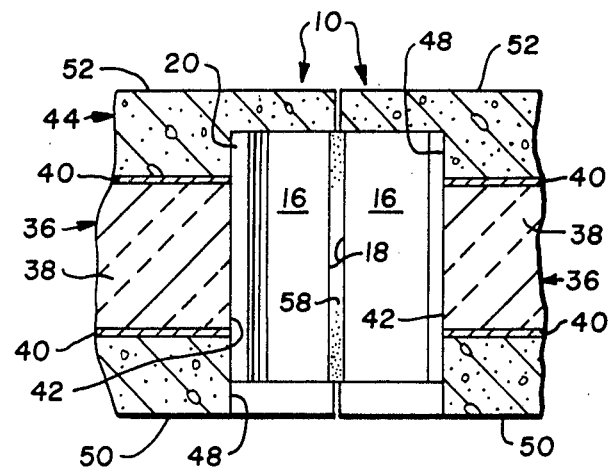
FIG. 3 is a fragmentary sectional view taken along the line 3—3 of FIG. 2.

Referring now more particularly to FIGS. 2 and 3, there is shown therein a preferred arrangement for installing two panels 10 in side by side relation and for effecting a welded joint therebetween. The joint shown is assumed to be between two of the panels 10 such as shown in FIG. 1 although it will be understood that the same welded joint arrangement could be utilized with other types of panels such as door panels, window panels and corner panels. Other examples of panels which may be formed with the joint arrangement are suggested in my aforesaid prior U.S. patent.

It will be noted from FIGS. 2 and 3 that when two panels are mounted in side by side relation the adjacent side edges of the two panels will provide adjacent pairs of vertically registering welding bars 16. In the embodiment shown in FIGS. 2 and 3 the joint arrangement is simply to fixedly secure each pair of adjacent welding bars 16 together by a conventional welding procedure which forms a line of welding material 58 extending horizontally along the outwardly facing edges 18 of each pair of associated welding bars 16, the line of welding material 58 serving to bridge any gap that may exist between the two surfaces 18. It will be noted that the spaces 48 formed in the concrete bodies 44 defining the panels 10 enable the line of welding material 58 to be applied by extending the welding equipment through the access space 48 which extends to the interior faces 50 of the associated panels. Note that the access spaces extend only to the interior faces 50 so that there are no such access openings provided in communication with the exterior faces 52 thus miminizing the required installation proceedings to install the rigidly fixed panels. It will be understood that the gap between the exterior faces 52 must be suitably grouted as would be the case with respect to both the access spaces 48 as well as the space between the spaces 50.

Figure 4:
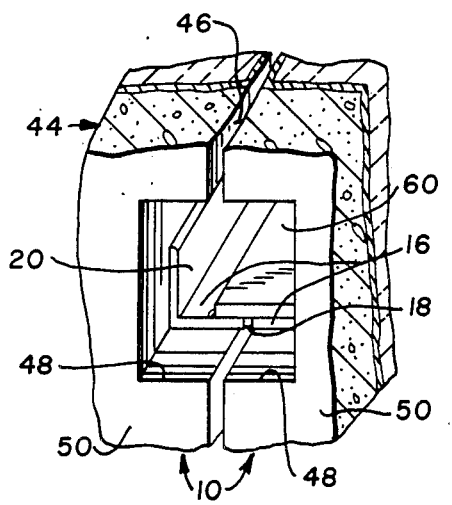
FIG. 4 is a view similar to FIG. 2 showing another arrangement for joining two panels in side by side relation.
Figure 5:
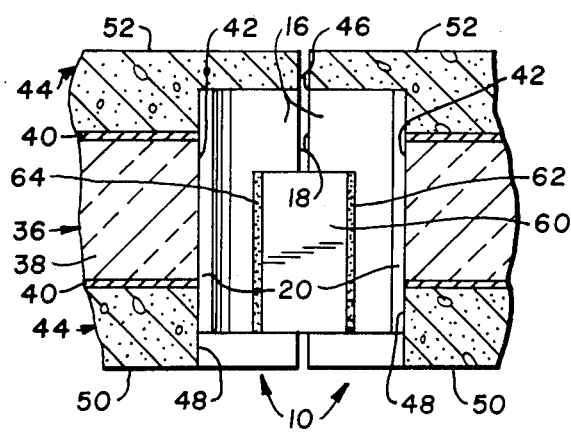
FIG. 5 is a sectional view similar to FIG. 3 taken along the line 5—5 of FIG. 4.

FIGS. 4 and 5 illustrate another arrangement for effecting the welded joint between two adjacent side by side panels 10. In this arrangement, each pair of welding bars 16 are rigidly interconnected by first providing a welding plate 60 in lapped relation with respect to the surfaces 18 of each pair of adjacent bars 16. Where the plate 60 is utilized one edge of the plate 60 is rigidly secured to one of the welding plates 16 by a first line of welding material 62 which is adhered to the associated edge of the plate 60 and the associated upper surface of the associated welding bars 16. A second line of welding material 64 is adhered along the opposite edge of the plate 60 and along the associated upper surface of the associated welding bar 16. It will be understood that the access space 48 which is provided in conjunction with the recesses 42 in the insulation 36 may be of other configurations than the rectangular prism configuration illustrated. For example, the access space could be tapered in a direction outwardly toward the interior faces 50. Moreover, it is within the contemplation of the present invention to extend the access openings to both faces 50 and 52 if desired.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

WHAT IS CLAIMED IS:

1. In a wall construction formed from a plurality of pre-cast reinforced concrete building panels each of which includes vertically extending interior and exterior faces defined peripherally by upper and lower end edges and opposed side edges extending therebetween, said plurality of panels including two adjacent panels disposed in side by side relation and means defining a welded joint between two adjacent side edges of the two adjacent side by side panels, the improvement which comprises said welded joint defining means comprising a plurality of vertically spaced parallel horizontally extending adjacent pairs of welding bars fixed within the two adjacent side edges respectively of said two side by side panels and means for rigidly securing each pair of adjacent welding bars together,
said securing means including welding material means adhered horizontally along each welding bar.

2. The improvement as defined in claim 1 wherein said welding material means comprises a single line of welding material adhered along both welding bars.

3. The improvement as defined in claim 1 wherein said securing means includes a plate disposed in lapped relation to each adjacent pair of welding bars and said welding material means comprises a first line of welding material adhered along said plate and one of the associated pair of welding bars and a second line of welding material adhered along said plate and the other of the associated pair of welding bars.

4. The improvement as defined in claim 1 wherein each of said welding bars is of L-shaped cross-sectional configuration.

5. The improvement as defined in claim 1 wherein each of said welding bars has a horizontal extent less than the width of the associated panel.

6. The improvement as defined in claim 5 wherein each of said welding bars is of L-shaped cross-sectional configuration.

7. A pre-cast reinforced concrete building panel operable to form a section of an exterior vertical wall of a building, said panel in operative position comprising:
a pair of metal reinforcing rod grids of a width generally equal to the width of the panel extending vertically generally throughout the vertical extent of said panel rigidly interconnected along their upper and lower edges in horizontally spaced relation,
a plurality of socket defining metal tubular members fixed rigidly to said grids and extending vertically in vertically aligned horizontally spaced relation along the upper and lower edges of the panel,
a block of rigid insulating material disposed between said grids generally throughout the width and vertical extent thereof,
said block having a plurality of vertically spaced parallel horizontally extending recesses formed in each side edge thereof,
each plurality of recesses being disposed in vertically registering relation with the recesses of the opposite side edge,
each of said recesses having a welding bar disposed therein extending in the direction of the width of the panel,
each of said welding bars being welded to the associated grid,
a body of concrete hardened in contact with said grids, said bars, said tubular members, and said block of insulating material so as to provide therewith (1) an upper horizontal edge configuration from which said socket defining tubular members extend vertically downwardly, (2) a lower horizontal edge configuration, (3) an exterior vertical face defining substantially the entire exterior wall configuration of the panel, (4) an interior vertical face defining substantially the entire interior wall configuration of the panel and (5) oppositely facing vertically extending side edge configurations defining the width of said panel in which said welding bars present a plurality of vertically spaced parallel horizontally extending welding surfaces each of which communicates with an access space in said body of concrete communicating with the associated block recess enabling welding operations to take place on the associated welding bar therethrough from a position outwardly of a face of said body of concrete.

8. A panel as defined in claim 7 wherein the access space associated with each welding bar opens to the interior face only of said body of concrete.

9. A panel as defined in claim 7 wherein each welding bar is of generally L-shaped cross-sectional configuration.

10. A panel as defined in claim 7 wherein each welding bar has a horizontal extent less than the width of the associated side edge of said body of concrete.

11. A panel as defined in claim 10 wherein each welding bar is of generally L-shaped cross-sectional configuration.

12. In a structure for receiving concrete in hardened relation therewith so as to provide a building panel operable to form a section of an exterior vertical wall of a building, said structure in operative position comprising a pair of metal reinforcing rod grids extending vertically generally throughout the vertical extent of said panel rigidly interconnected along their upper and lower edges in horizontally spaced relation, and a block of rigid insulating material of a width equal to the width of the panel disposed between said grids generally throughout the vertical extent thereof and having opposite exterior side edges adjacent the side edges of said grids and the improvement which comprises:

said blocks having a plurality of vertically spaced recesses formed in each side edge thereof, each plurality of recesses being disposed in vertically registering relation with the recesses of the opposite side edge, each of said recesses having a welding bar disposed therein extending in the direction of width of said block, each of said welding bars being welded to the associated grid.

13. The improvement as defined in claim 12 wherein each of said welding bars is of L-shaped cross-sectional configuration.

14. The improvement as defined in claim 12 wherein each of said welding bars has a horizontal extent less than the width of the associated panel.

15. The improvement as defined in claim 14 wherein each of said welding bars is of L-shaped cross-sectional configuration.

* * * * *